March 5, 1957 H. J. BAMBI 2,783,698
MULTIPLE CLASSIFIER VIBRATING SCREEN
Filed Sept. 3, 1953 3 Sheets-Sheet 1
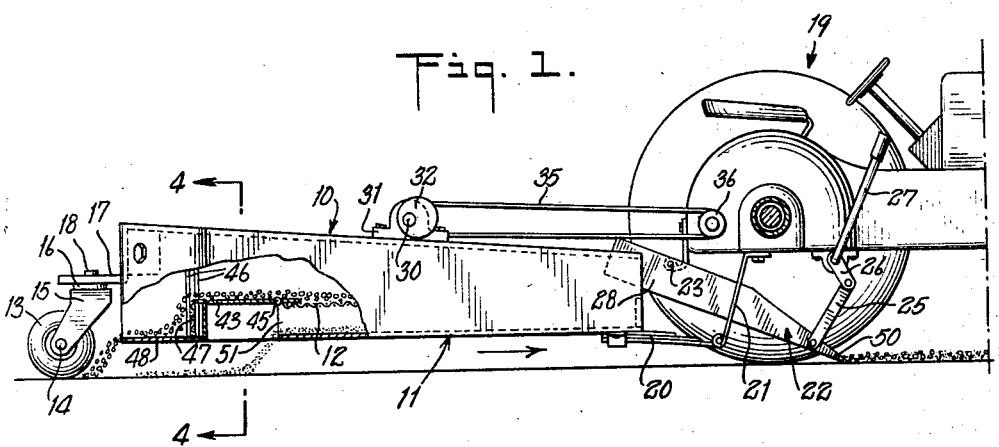
Fig. 1.
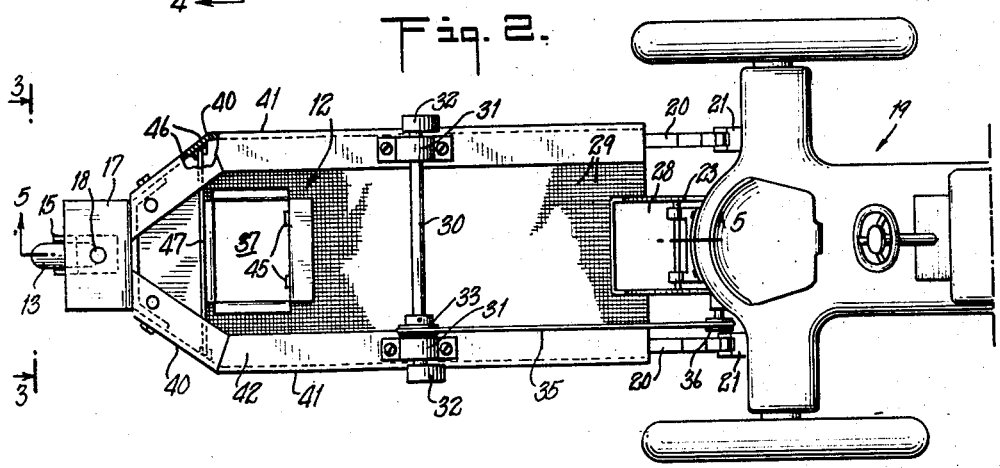
Fig. 2.
Fig. 3.
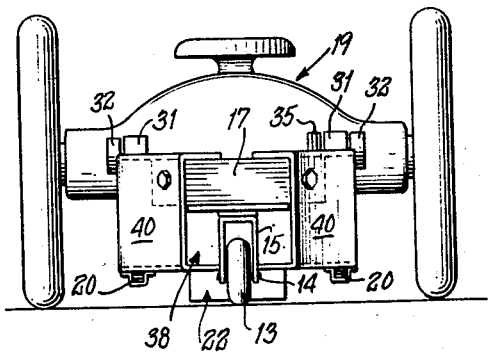
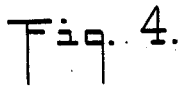
Fig. 4.
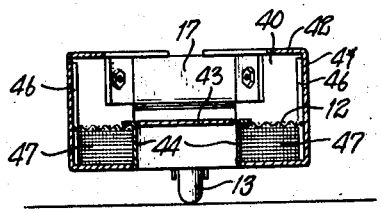
INVENTOR.
HARRY J. BAMBI
BY
ATTORNEY

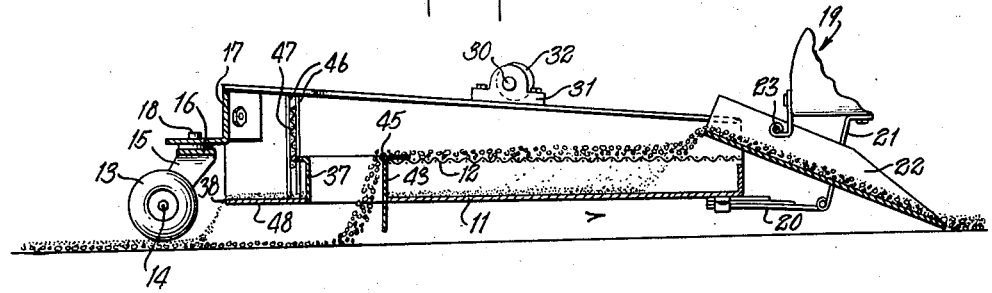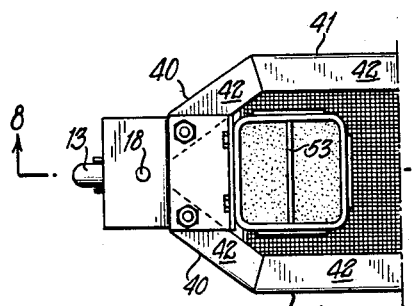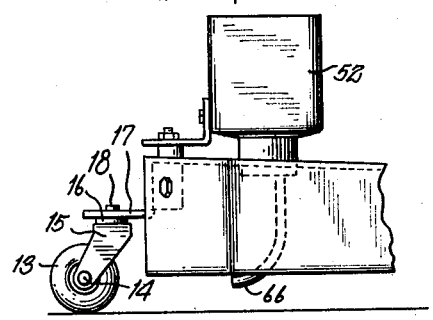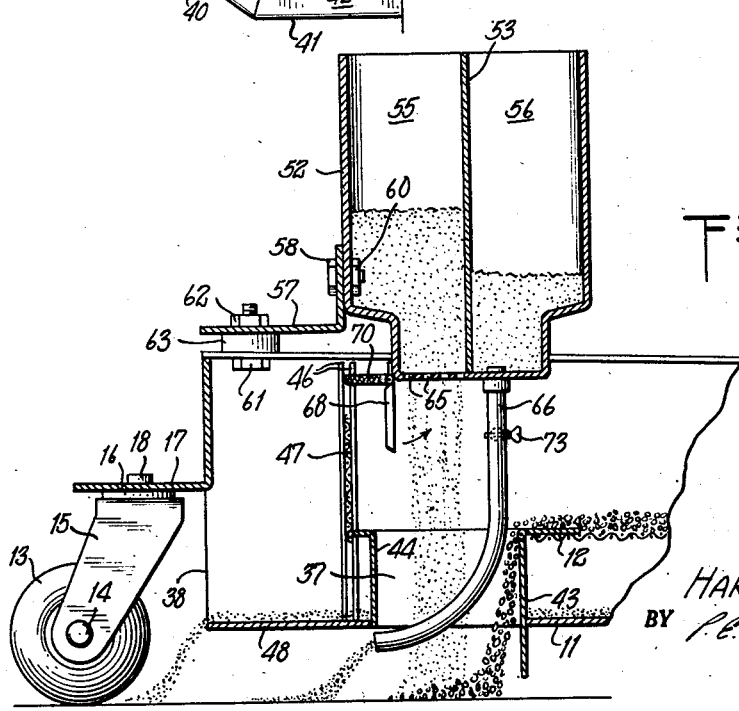

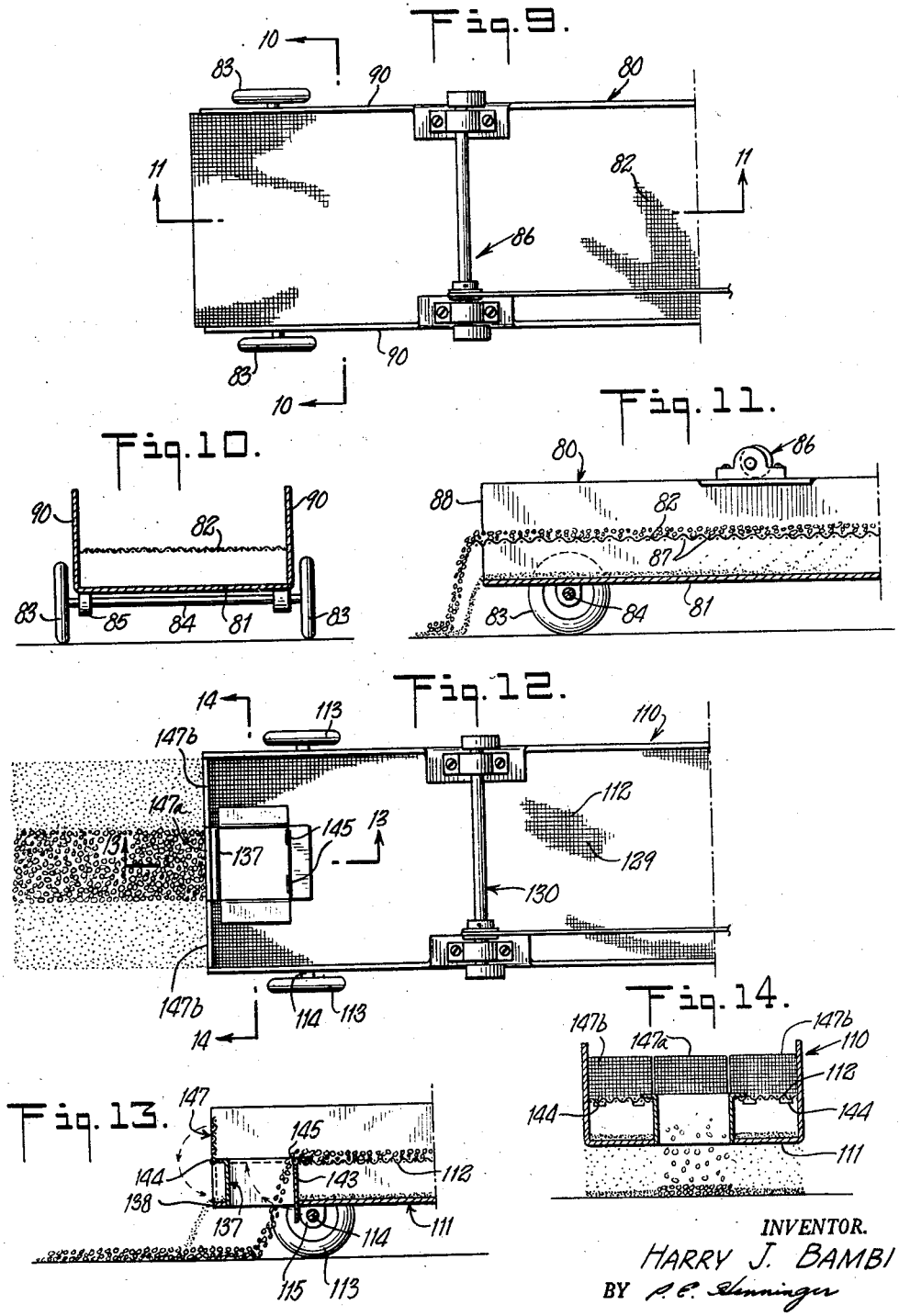

United States Patent Office 2,783,698
Patented Mar. 5, 1957

2,783,698
MULTIPLE CLASSIFIER VIBRATING SCREEN

Harry J. Bambi, Norristown, Pa.

Application September 3, 1953, Serial No. 378,303

7 Claims. (Cl. 97—10)

This invention relates to soil preparing devices such as terracers, and more particularly, to a device for scooping unclassified soil, classifying it according to particle size and depositing the classified soil in a selected manner.

It has been found useful in the preparation and grading of soil for road building, farming and in preventing erosion, and for other purposes, to classify soil according to size and to deposit it in selected superimposed layers or strata and also in adjoining strips. For example, in certain types of farming, it has been found desirable to classify the soil into fine particles and into coarser particles, such as pebbles and stones, and to deposit the pebbles and stones beneath the fine particles of soil so as to provide good drainage for the crops. In other instances, it has been found desirable to lay the pebbles, stones and coarser particles in the upper layer, or in lateral strips between strips of fine particles so as to maintain the moisture in the upper layer of the ground and also to prevent loss of top soil by wind erosion as well as water erosion. Strips of stones interspaced on the surface between rows of crops have also been found desirable for retaining heat in the ground. The heating of the stones during the day lessens the danger of frost damage during the night in the spring and fall. Such strips of stones also discourage weeds between rows of crops. In addition, the stones on the surface are useful in supplying minerals to the soil which are beneficial in the growing of crops.

Another example of selectively arranging classified soil is in the grading of unclassified soil for temporary roads or in the formation of a road bed. In the case of temporary roads, particularly, it is desirable to classify the fine particles and the coarser particles, and to deposit the coarse particles in the upper stratum on top of the fine particles so as to give vehicles passing over the road sufficient traction and to prevent the vehicles from miring in mud and sand.

It is an object of this invention to provide an apparatus for classifying soil and depositing it in selected strata and in selected strips.

It is a further object of the invention to provide an apparatus which may be used for cultivating land and can achieve in one operation the tilling of the land, the classification of the particles of the soil, the depositing of the fine and coarser particles in selected strata or strips, and the seeding and fertilizing.

Other objects of the invention will be as noted from the description of the invention.

The invention consists of a means for preparing soil which includes scooping up unclassified soil, classifying the soil according to particle size and depositing the classified soil in a selected manner. The means may consist of an ambulatory apparatus for receiving unclassified soil, classifying the soil, and depositing it in a selected manner so that one size of particles is above the other in different strata, or the particles are laid down in adjacent strips in the same stratum. The apparatus may include a body member with a bed and a soil classifying shelf positioned in spaced relationship above the bed. Means such as wheels may be provided for supporting the body for ambulatory movement. Means for feeding the unclassified soil to the classifying shelf are provided, and classifying means permitting the fine particles to pass from the shelf to the bed and retain the coarser particles on the shelf are also provided. Also, means are provided for delivering and depositing the coarser particles and the fine particles in the different layers and strips selectively as desired. The means for feeding the unclassified soil to the classifying shelf may include an adjustable scoop with a trough to guide the material scooped from the ground into the shelf.

The classifying means may consist of a vibrator for vibrating the shelf and perforations of selected size formed in the shelf whereby the fine particles pass through the perforations to the bed and the coarser particles are retained on the shelf.

The means for delivering the fine and coarser particles selectively in different strata or strips with respect to each other includes more than one delivery means spaced from each other and means for selectively directing the particles on the shelf through one delivery means and directing the particles on the bed through another of said delivery means.

For a more complete description of the invention, reference is made to the drawings wherein:

Figure 1 is a side view of one form of apparatus embodying the invention, parts of the apparatus being cut away to show interior details;

Fig. 2 is a plan view of the apparatus shown in Fig. 1;

Fig. 3 is a rear view as taken along the line 3—3 in Fig. 2;

Fig. 4 is a sectional view taken along the line 4—4 in Fig. 1;

Fig. 5 is a longitudinal sectional view taken along the line 5—5 in Fig. 2;

Fig. 6 is a top plan view of the rear portion of the form of apparatus shown in Figs. 1 to 5 inclusive, with a compost, fertilizer and seed reservoir attached;

Fig. 7 is a side view of the rear portion of the apparatus showing the compost, fertilizer and seed reservoir attachment;

Fig. 8 is a longitudinal section taken along the line 8—8 in Fig. 6 showing the interior details of the compost, fertilizer and seed feed attachment;

Fig. 9 is a plan view of an alternate form of apparatus embodying the invention;

Fig. 10 is a sectional view of the apparatus of Fig. 9 taken along the line 10—10 in Fig. 9;

Fig. 11 is a longitudinal section taken along the line 11—11 in Fig. 9 showing the relationship of the classifying shelf to the bed of the apparatus;

Fig. 12 is a plan view of another form of apparatus embodying the invention;

Fig. 13 is a longitudinal section taken along the line 13—13 in Fig. 12; and

Fig. 14 is a sectional view taken along the line 14—14 in Fig. 12.

Referring to Figs. 1 to 5, the terracing apparatus of this invention includes a body 10 having a bed 11 adapted to retain fine particles of soil and a classifying shelf 12, best shown in Figs. 2, 4 and 5.

Suitable means for supporting the apparatus may include a wheel 13 rotatably mounted on an axle 14; the axle 14 being supported by lateral members 15. The lateral members 15, which are connected by a crosshead 14, may be pivotally mounted at 16 to bracket 17 fixed at the rear end of the body 10, the members 15 being arranged to pivot about the post 18, as best shown in Fig. 2, in a manner similar to a caster.

The front end of the body 10, at the right as viewed in Fig. 1, may be resiliently supported by a tractor 19, or other suitable traction means. The resilient support may consist, for example, of leaf springs 20 on either side of the bottom of the body, attached to bracket members 21 fixed to the tractor.

Means for feeding unclassified soil to the classifying shelf 12 may include a scoop 22 which may be pivotally mounted at 23 and may be provided with an adjustment means, including linkage elements 25 and 26, connecting the front end of the scoop to a control lever 37 whereby the height of the front end may be varied as desired to scoop more or less soil or to be raised completely out of soil-engaging position. The rear portion 28 of the scoop 22 is formed into a trough for guiding the soil, which has been scooped up, to the screen 12.

Classifying means are provided to classify the soil which is received from the trough 28. The classifying means may include perforations 29 formed in the shelf 12. Vibrating means are also provided to assist in the classification of the particles. The vibrating means may include an axle 30 supported, on the body 10, for rotation in bearings 31. Eccentrically disposed weighted members 32 are mounted on the shaft 30. Means are provided for driving the shaft, such as pulleys 33 and 36 connected by belt 35. The pulley 36 may be driven by suitable means in the tractor. As the shaft 30 is rotated, the eccentrically mounted members 32 will set up a vibratory motion in the body.

The perforations or apertures 29 in the shelf 12 may be of any desired size to permit the passage of fine particles of a predetermined size to pass therethrough and onto the bed 11 of the body of the apparatus. As shown in the drawings, the shelf 12 may be a screen having suitable mesh size. The vibrations caused by the rotation of the shaft 30 and the eccentric movement of the elements 32 causes the unclassified material delivered to the shelf 12 to be tossed about until the fine particles pass through the perforations 29, the large particles being retained on the shelf 12. The vibratory action also assists in the movement of the particles on both the shelf and the bed from the front end of the apparatus to the rear end, i. e., from the right and left hand ends respectively in Figs. 1, 2 and 5.

With regard to the vibration means, it has been found that rotating the shaft 30 in a clockwise direction, as viewed in Fig. 1, causes a slower movement, of the particles from the forward end to the rear end of the apparatus, than rotation in a counter-clockwise direction. If in any particular situation it is desirable to have more rapid or slower movement of the particles, the direction of rotation of the shaft may be changed by removing the belt from one of the pulleys, for example, pulley 36, and twisting the belt once and replacing it on the pulley. To assist the movement of the particles toward the rear of the apparatus, the bed for retaining the fine particles and the shelf for retaining the coarser particles, may be tilted slightly toward the rear. The desired tilt of the apparatus and the speed and direction of rotation of the vibrating means, may be determined and adjusted as desired.

In the form of apparatus shown in Figs. 1 and 5, there are two depositing or delivery means spaced from each other. One is a vertical chute 37, best shown in Figs. 1 and 5, spaced from the rear of the body 10, and extending from the shelf 12 downward and through the bed 11. The other delivery means is the opening 38 defined in the rear of the body between the converging sides 40 of the apparatus.

The converging sides 40 and parallel sides 41, and associated coping 42 at the top of the apparatus are provided to retain the soil particles in the apparatus during their treatment and to direct them toward the delivery means.

Means are provided for selectively directing the fine particles through one of the delivery means and the coarser particles through the other delivery means. Such means may include any desired combination of gates for selectively permitting and barring access to the two delivery means from the shelf 12 and the bed 11. A suitable arrangement is illustrated in Figs. 1 and 5 in which chute wall 43 functions as a gate, being pivotally mounted on hinges at 45. In the position shown in Fig. 1, the gate 43 has been swung upward on the hinges 45 so that entrance to the chute 37 from the shelf 12 is barred by the member 43. Entrance to the chute may be gained from the bed 11 through opening 51 when the gate 43 is in the upper position, shown in Fig. 1. Suitable locking means may be provided to releasably maintain the gate 43 in the upper position shown in Fig. 1, and in the lower position shown in Fig. 5.

In Fig. 1, a barrier 47 prevents passage of material on the bed 11 outwardly through the opening 38, whereas, the coarser particles on the shelf 12 pass over the end of the shelf 12 and on to the rear portion 48 of the bed 11 and move out through the delivery exit 38. In the arrangement shown in Fig. 1, as the apparatus moves from left to right, the unclassified soil is dug or scooped up by the cutting blade 50 of the scoop 22 and is delivered through the trough portion 28 of the scoop onto the shelf 12. The material delivered to the shelf 12 is classified, the fine particles passing through the perforations 29 in the shelf and the coarser particles being retained on the shelf. With the gate 43 in the position shown in Fig. 1, the fine particles are permitted to pass through the opening 51 and out through the delivery chute 37; the particles being deposited beneath the apparatus in a layer as the apparatus is moved forward. The coarser particles are carried over the delivery means 37, the opening to the delivery means from the shelf 12 being closed by the gate 43, in the position shown in Fig. 1, and the coarser particles are dropped on to the rear portion 48 of the bed 11 and pass out through the delivery opening 38 at the rear of the apparatus and are deposited on top of the finer particles which already have been laid down. In the apparatus shown in Figs. 1 to 5, a strip of classified particles is laid down the width of the chute opening 37 which is the same width as the rear exit 38.

When the gate 43 is in the lower position shown in Fig. 5, and the apparatus is moved forward, that is, from left to right, as shown in the figure, the coarser particles from the shelf 12 pass from the shelf to the chute or delivery means 37 and are deposited in a first layer beneath the apparatus. The closed gate 43 blocks passage of the fine particles through the chute 37 and they pass around the chute, which is closed on the other three sides by walls 44 to prevent access from the bed 11. After passing around the chute 37, the fine particles move over the rear portion 48 of the bed 11 and are delivered through the rear opening 38. The barrier 47 has been raised from the position shown in Fig. 1 to the position shown in Fig. 5 to prevent the passage of any of the coarser particles over the end of the shelf 12 and on to the rear portion 48 of the bed 11. In the arrangement shown in Fig. 5, the fine particles passing through the rear opening 38 are deposited in a layer on top of the coarser particles. The barrier 47 may be suitably arranged to be raised and lowered from the position shown in Fig. 1 to the position in Fig. 5 by sliding in guides 46 on the inner faces of the sides 40, as shown in Fig. 2. Suitable locking means may be provided to releasably maintain the barrier in the upper and lower positions.

In the building of roads or in the providing of erosion preventing strips on embankments or in other locations in which the soil is subject to wind or water erosion, it has been found desirable to classify the material and lay the coarser particles on top of the fine particles, the coarser particles sometimes being pebbles or medium sized stones. For such purposes, the apparatus of this invention may be used with the gate 43 and the barrier 47 in the positions shown in Fig. 1.

In the case of certain farm crops, it has been found desirable to classify the soil into fine and coarser particles and to deposit the coarse layer below the fine particle layer so as to give adequate drainage for the crops. For this purpose, the apparatus is adjusted so that the gate and barrier are in the positions shown in Fig. 5.

Referring now to Figs. 6 to 8 inclusive, a compost, fertilizer and seed attachment may be used in conjunction with the apparatus shown in Figs. 1 to 5 and described hereinabove. Such an attachment may consist of a container 52 which may be provided with a suitable dividing member 53, as shown in Figs. 6 and 8, to define a fertilizer and compost reservoir 55, in one portion of the container and a seed reservoir in another portion of the container. The container may be supported above the chute 37 by means of a bracket 57 to which the container is fixed by bolts 58 and nuts 60; the bracket 57 being fixed to the body 10 of the apparatus by means of bolts 61 and nuts 62 which may be connected through the coping 42. Spacer means 63 of suitable resilient material may be employed between the bracket and the body 10 as shown in Fig. 8 to absorb a portion of the vibration if desired. However, a small amount of vibration in the container 52 is desirable to assist the gravity feed of the materials contained therein. The lower portion of the container 52 may be formed to define openings 65 under the compost and fertilizer reservoir to permit the compost and fertilizer to pass therethrough by gravity. A feed pipe 66 may be connected through the bottom of the container to the seed reservoir. The seed delivery pipe 66 may be curved to deliver the seeds through the rear of the chute 37 as indicated in Fig. 8, the compost and fertilizer passing directly downwardly through the chute, for the openings 65 in the container are arranged directly above the chute 37. Closer means such as a cap 68 may be provided at the lower end of the container and may be hinged so that it can be swung upwardly as indicated by the arrow in Fig. 8 to shut off the flow of fertilizer and compost through the openings 65. A hand lever 70 may be provided for the operation of the cap 68 and suitable latch means may be provided to maintain the cap in closed position when desired.

A butterfly valve 73 or other similar device may be used in the seed delivery pipe 66 to control the flow of seed therethrough.

With the arrangement shown in Figs. 6 to 8 inclusive, as the coarse material passes from the shelf 12 down through the chute 37, the fertilizer is deposited on top of the coarse particles. The seed is deposited on top of the fertilizer and compost and the fine particles are deposited on top of the seed. In this manner and by utilizing this apparatus, the soil may be properly tilled by the scoop to the proper depth, the material classified, the coarser particles deposited in a first layer, the fertilizer and compost in a second layer, the seed may be deposited on the compost and fertilizer and the fine particles deposited on the seed. By such an arrangement, it will be appreciated that the tilling, fertilizing and seeding may be carried out in a single operation.

Referring now to Figs. 9, 10 and 11, which show an alternate form of apparatus embodying the invention, the body 80 includes a bed 81, a classifying shelf 82, wheels 83 mounted on axle 84, the axle being mounted on the under side of the body 80 in members 85. In the apparatus of this form, the material is received at the forward end, i. e., the right hand side of the scoop 22 shown in Figs. 1 to 5. Scoop similar to the scoop 22 shown in Figs. 1 to 5. Vibrator means 86, similar in construction and operation to the vibrator means shown in Figs. 1 and 5 may be provided. The form of apparatus shown in Figs. 9 and 10 may also be connected to a traction means by resilient spring means, as described in connection with the form of the invention shown in Figs. 1 and 5. As the apparatus is moved forward, that is, from left to right, in Figs. 9 and 11, material is scooped up and delivered to the shelf 82 and is classified, the fine particles dropping through perforations 87 in the shelf 82 and being received on the bed 81 of the apparatus; the coarser particles being retained on the shelf 82. Due, in part, to the vibration of the apparatus, the particles on the bed and the shelf move toward the rear 88 of the apparatus which is in the form of an open tail-gate. The fine particles are deposited in a first layer and the coarser particles are deposited on top of the fine particles in a second layer. To obtain sufficiently clear definition of the two layers, it may be found desirable to have the shelf 82 extend further rearwardly than the bed 81, as indicated in Fig. 11.

The scoop employed with the apparatus shown in Figs. 9 to 11 may be substantially the same width as the width of the apparatus, or a narrower scoop may be employed if desired.

In the apparatus shown in Figs. 9 to 11, sides 90 may be provided to retain the particles on the shelf 82 and in the bed 81 during their classification and passage from the front to the rear of the apparatus. The apparatus of this form is particularly useful in preparing road beds.

In the form of the apparatus shown in Figs. 12, 13 and 14, a body portion 110 includes a bed 111 and a shelf 112. The body is supported for ambulatory movement by wheels 113 carried on axles 114 which are connected to the body 110 by members 115. The apparatus may include scoop means at its forward end, i. e., the right hand side, as viewed in Fig. 12 to deliver unclassified soil to the shelf 112. Perforations 129 are formed in the shelf 112 to permit the passage of fine particles from the shelf 112 to the bed 111. Vibrating apparatus 130 is provided for assisting in the classifying of the material. An exit chute 137 is provided adjacent the rear of the apparatus, the chute extending from the shelf 112 through the bed 111. Forward wall 143 may be pivotally mounted on hinges 145 so that it may be used as a gate and may be moved from the solid line position shown in Fig. 13 to the broken line position shown in that figure. In the solid line position, the wall 143 acts to close the chute to the fine particles and to permit the coarse particles to enter the chute, the fine particles passing around the chute and being delivered through opening 138 in the rear end of the apparatus. A retaining wall 147 may be provided at the rear end of the shelf 113 to prevent the passage of coarser particles over the rear end of the shelf when in the full line position shown. The retaining wall 147 may be divided into a fixed central portion 147a and two pivotally mounted lateral portions 147b which are pivotally mounted at 144 on suitable hinge means. When the gate 143 is moved into the broken line position shown in Fig. 13, the lateral portions 147b may be swung down, as indicated by the arrow, to block the passage of fine particles through the opening 138.

With the gate 143 and the lateral portions 147b in the solid line position the classified material is deposited with the fine particles in two lateral strips and with the coarse material in a central strip, as shown in Figs. 12–14. The coarser particles pass from the shelf 112 out through the chute 137 to form the central strip and the fine particles pass out through the rear opening 138 on both sides of the chute 137 to form the two lateral strips.

With the gate 143 swung upwardly and the lateral portions 147b of the rear barrier swung down to the broken line positions, shown in Fig. 13, the fine particles pass through the chute 137 and the coarser particles pass over the rear end of the shelf 112 passing through the openings on the two sides of the central fixed portion 147a of the barrier or rear retaining wall 147. Therefore, with the parts 143 and 147b of the apparatus in the broken line positions, a central strip of fine particles is laid down with two lateral strips of coarser particles. Suitable releasable locking means may be provided to releasably hold the gate 143 and the lateral portions 147b in the upper and lower positions as desired. This type of terracing or soil preparation in which alternate strips of fine and coarser particles may be laid down has been found particularly useful in certain types of agriculture, especially in dry areas where it is desired to retain the moisture in the soil. The alternate strips of coarser particles, including stones and pebbles, have been found to retain moisture in the upper soil very effectively. The use of the strips of pebbles and stones also serves to prevent erosion loss during wind storms in dry country, and the coarse strip is effective in controlling weeds between rows of crops. In addition, such strips of stone or coarse particles between the rows of crops encourage earth worms to stay near the surface because of the affinity of such worms for the dark, damp conditions which exist under the stones.

Also strips of pebbles and stones have been found effective in retaining warmth in the soil and reducing the danger of frost, the stones being heated by the sun during the day and giving the heat to the ground during the night.

From the foregoing, it will be noted that this invention achieves the objects set out above of providing an apparatus for classifying soil and depositing it in selected strata and in selected strips, and of providing an apparatus which may be used for cultivating land and can achieve in one operation the tilling of the land, the classification of the particles of the soil, the depositing of the fine and coarser particles in selected layers and the seeding and fertilizing.

The concept of scooping up soil, classifying it and selectively discharging the fine and coarser particles in predetermined order, either in lateral strips or in different layers, together with the several forms of apparatus of this invention, provide a new and useful means of preparing soil for various uses.

In accordance with the provisions of the patent statutes, I have herein described the principle of operation of the invention, together with the elements which I now consider the best embodiments thereof, but I desire to have it understood that the structure disclosed is only illustrative and the invention can be carried out by other means. Also, while it is designed to use the various features and elements in the combinations and relations described, some of these may be altered and modified without interfering with the more general results outlined.

Having thus described my invention, I claim:

1. An ambulatory terracing apparatus for receiving unclassified soil, classifying the soil and discharging the classified soil in a selected manner, comprising, a body member having a bed, a soil-classifying shelf spaced from said bed, means for supporting the body for ambulatory movement, means for feeding unclassified soil to the classifying shelf as the apparatus is moved in one direction, classifying means for permitting fine particles to pass from the shelf to the bed and for retaining coarser particles on the shelf, more than one delivery means spaced from each other for delivering particles, and means for selectively directing the particles on the shelf through one delivery means and the particles on the bed through another of the delivery means.

2. An ambulatory terracing apparatus for classifying particles and depositing them selectively in different layers with respect to each other, including an ambulatory body, means for delivering unclassified soil to said body as it is moved in one direction, means for classifying the particles received in the body, and more than one delivery means spaced from each other in the body in the direction of travel of the body, and means for selectively directing the classified particles through one of said delivery means.

3. An ambulatory terracing apparatus for classifying particles and depositing them selectively in different layers with respect to each other, including an ambulatory body, means for moving said body, means for delivering unclassified soil to said body as it is moved in one direction, means for classifying the particles received in the body and more than one delivery means spaced from each other in the body in the direction of travel of the body, means for selectively and alternately permitting and preventing passage of fine particles and coarser particles through each of said delivery means.

4. An ambulatory soil-treating apparatus for receiving unclassified soil, classifying the soil and discharging the classified soil in a selected manner comprising a body member having a bed, a soil-classifying shelf spaced from said bed, means for supporting the body for ambulatory movement, means for moving the body in at least one direction, means for scooping unclassified soil and delivering it to the classifying shelf as the apparatus is moved in one direction, means for vibrating the shelf, perforations formed in the shelf for permitting a fine class of particles to pass from the shelf to the bed, leaving a coarser class of particles on said shelf, more than one delivery means, means for alternately and selectively directing one class of particles through one of said delivery means while delivering the other class of particles through another delivery means whereby the classified soil may be deposited in a selected manner.

5. An ambulatory soil-treating apparatus for receiving unclassified soil, classifying the soil and discharging the classified soil in a selected manner, comprising a body member having an upper soil classifying shelf for receiving unclassified soil and permitting fine particles to pass from the shelf while retaining coarser particles, a fine-particle-receiving bed disposed beneath the shelf, two delivery means extending from the shelf through the bed, means for permitting access of the particles from the shelf and the bed to said delivery means, and means for alternately and selectively permitting access of one class of particles to one delivery means and the other class of particles to the other delivery means, whereby said particles may be deposited in selected arrangement with respect to each other.

6. An ambulatory terracing apparatus for receiving unclassified soil, classifying the soil and discharging and redepositing the soil in a selected manner, comprising, a body member having a fine-particle-retaining bed, a soil-classifying shelf spaced from said bed, means for supporting the body for ambulatory movement, means for moving the body in at least one direction, means adjacent the forward end of the body for scooping up and delivering unclassified soil to the shelf as the body is moved forward in one direction, classifying means for permitting fine particles to pass from the shelf to the bed and for retaining coarser particles on the shelf, two delivery means spaced from each other in the direction in which the body is moved, each of said delivery means having entrances to permit passage of particles from the shelf and the bed through said delivery means for redepositing the particles as the body is moved forward, means associated with each delivery means for selectively and releasably closing the entrance thereto from said shelf and for opening the entrance to said delivery means from said bed, and means for closing the entrance from the bed and for opening the entrance from said shelf to said delivery means.

7. An ambulatory terracing apparatus for receiving unclassified soil, classifying the soil and discharging the classified soil in a selected manner comprising a body member having a bed, a soil classifying shelf spaced from said bed, means for supporting the body member for ambulatory movement, means for feeding unclassified soil to the classifying shelf, classifying means for permitting fine particles to pass from the shelf to the bed and for retaining coarser particles on the shelf, and more than one delivery means, said means being selectively connectable to the shelf and bed, whereby the particles may be selectively deposited in different arrangements with respect to each other during the ambulatory movement of the apparatus.

References Cited in the file of this patent

UNITED STATES PATENTS

| | | |
|---|---|---|
| 1,239,599 | Hicks | Sept. 11, 1917 |
| 1,819,092 | Hall | Aug. 18, 1931 |

FOREIGN PATENTS

| | | |
|---|---|---|
| 936,970 | France | Feb. 23, 1948 |

OTHER REFERENCES

Standard Cyclopedia of Horticulture (Bailey), published by MacMillan Co. (N. Y.) 1935, reprinted 1943; vol. 3, pages 3178, 3179.